Patented Feb. 16, 1926.

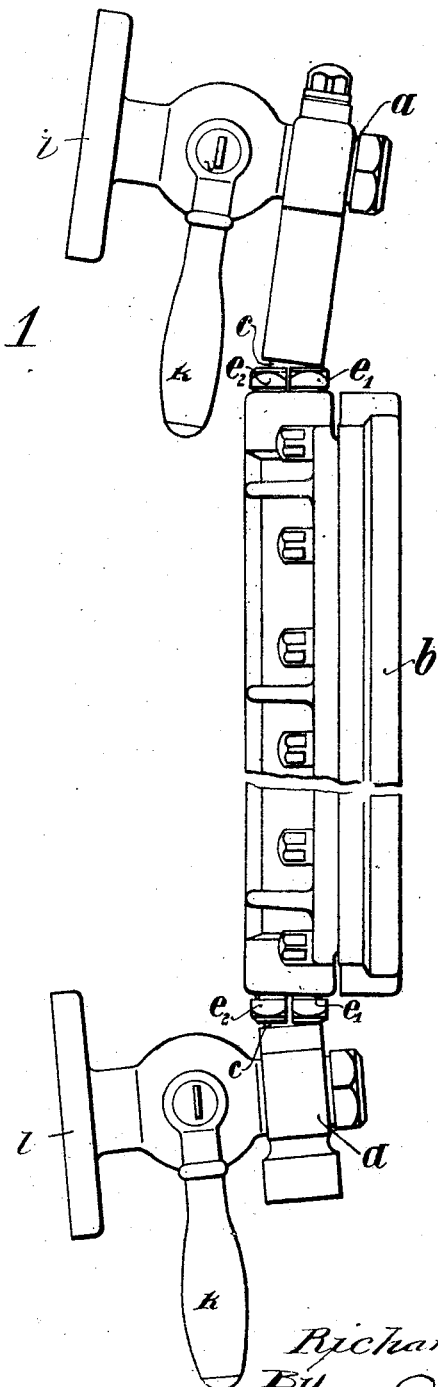

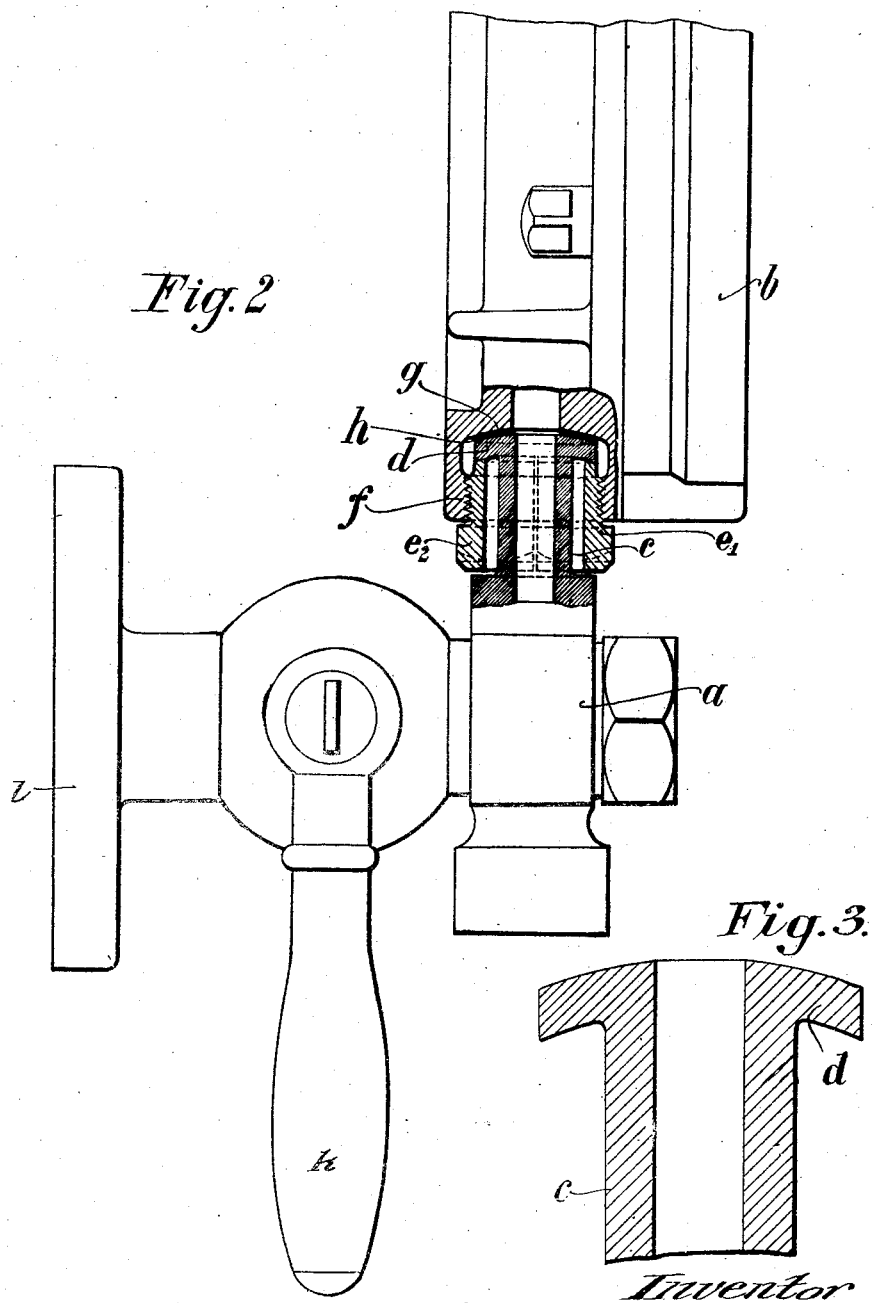

1,573,719

UNITED STATES PATENT OFFICE.

RICHARD KLINGER, OF GUMPOLDSKIRCHEN, AUSTRIA, ASSIGNOR TO THE FIRM OF RICH. KLINGER GES. M. B. H., OF GUMPOLDSKIRCHEN, AUSTRIA, A CORPORATION OF AUSTRIA.

WATER-LEVEL INDICATOR.

Application filed October 26, 1922. Serial No. 597,225.

*To all whom it may concern:*

Be it known that I, RICHARD KLINGER, a citizen of the Czechoslovakian Republic, and residing at Gumpoldskirchen, Austria, have invented certain new and useful Improvements in Water-Level Indicators, of which the following is a specification.

This invention relates to water-level indicators of the type embodying a sight glass member and of the kinds used on steam boilers and the like for indicating the level of water therein. The invention contemplates the provision of a water level indicator which allows swiveling movement of the sight glass member on its longitudinal axis and also variation of the angular position of the cock shells relatively to the sight glass member without damaging the packing or otherwise injuring the water-level indicator.

Provision for swivelling the sight glass member on its longitudinal axis is desirable in water-level indicators of the type wherein the sight glass is enclosed in a non-transparent protecting casing provided with a glazed sight opening in one side thereof, especially where the sight glass member is provided with a reflecting surface for illuminating it, swivelling of the sight glass member enabling the glazed sight opening or the reflecting surface thereof to be brought into the path of a beam of light coming in any direction from a suitable source and hence enabling the attendant to obtain a proper reading of the level of the water.

By providing for variations in the angular position of the cock shells relatively to the sight glass member, due to warping of the boiler shell or other causes, the present invention enables a watertight joint to be maintained at all times between the cock shells and the sight glass member, regardless of the angular position of the cock shells relatively to the water-level glass, thus overcoming the disadvantage found to exist in water-level indicators of the kinds heretofore used, namely, the impossibility of ensuring a tight joint between the cock shells and sight glass member for more than a short time, whereas the joining surfaces of the cock shells and the sight glass member, according to the present invention, are so constructed as to maintain a tight joint between them, notwithstanding variations in the angularity of the cock shells relatively to the sight glass member may take place due to the unavoidable warping of the boiler shell.

In constructing a water-level indicator in accordance with the preferred form of the invention, the sight glass member is connected at its ends to the two cock shells by nipples on the cock shells which act as pivots about which the sight glass member may swivel on its longitudinal axis, each of these nipples projecting loosely through a hollow split nut which is threaded into the respective end of the sight glass member and presses a flange formed on the respective nipple against a packing-ring which is preferably inserted between said flange and a seat formed in the respective end of the sight glass member. The face of the flange of the nipple which is engaged by the nut and also the face thereof which engages the packing ring are parallel and spherical, and also, the seat in the end of the sight glass member which is engaged by the packing ring has a complemental spherical form. The joints thus formed between the cock shells and the sight glass member not only permit swivelling of the latter without disturbing the tight fit at such joints, but such joints also compensate for variations in the angularity of the cock shells relatively to the sight glass member, due to warping or distortion of the boiler shell to which the cock shells are attached and yet avoid leakage at such joints.

In the drawings:—

Figure 1 is an elevation of a water-level indicator constructed in accordance with the present invention, the cock shells and their nipples being shown in the position which they may assume relatively to the sight glass member, due to warping of the boiler shell, the nipples of the cock shells being then deflected out of alinement with the longitudinal axis of the sight glass member; and Figure 2 is a detail view on an enlarged scale and partly in section, of the lower cock shell and the lower part of the sight glass member.

Figure 3 is a sectional view, on an enlarged scale, of one of the cock shell nipples.

The fittings or cock shells *a* are each provided with a water-level cock *k*, and a flange *l* by which they are fixed to the boiler shell, the cock shells being provided with nipples $c$ which act as pivots about which the sight glass member $b$ may swivel on its longitudinal axis for the purpose hereinbefore described, these nipples projecting into sockets $f$ formed in the upper and lower ends, respectively, of the sight glass member. Each nipple is formed with a terminal peripherally-projecting flange $d$ having upper and lower parallel spherical faces, and each nipple is surrounded by a hollow axially-split nut $e^1$, $e^2$ which is screwed into the socket $f$ in the respective end of the sight glass member. The seat $g$ in the socket $f$ of this member is likewise of spherical form and the packing ring $h$ which is inserted between it and the upper face of the flange $d$, under the pressure of the tightened screw $e^1$, $e^2$, produces a fluid-tight joint between the respective nipple of the cock shell and the sight glass member which remains permanently fluid-tight notwithstanding that the sight glass member may be rotated, and also and more particularly, it maintains a permanently fluid-tight joint notwithstanding deviations of the cock shells into angular positions relatively to the sight glass member, as illustrated, for example, in Fig. 1, the universal joints thus provided between the ends of the sight glass member and the nipples of the cock shells compensating for such angular movements as may take place between the parts.

I claim:—

1. A water level indicator comprising two cock shells each having a flange by which it may be secured to a boiler shell, each of said cock shells also being provided with a nipple, a sight glass member having a socket formed in each of its ends to receive one of said nipples and to permit said sight glass member to swivel on its longitudinal axis, each of said nipples being formed with a terminal peripherally projecting flange having upper and lower parallel spherical faces, a hollow longitudinally split nut surrounding each nipple and screwed into the socket of the sight glass member into which its associated nipple extends, each socket of the sight glass member having a seat of spherical form, and means for forming a permanently fluid-tight joint between each of said sockets and the flange of its associated nipple irrespective of angular deviations of the cock shells relatively to the sight glass member.

2. A water level indicator comprising a sight glass member having sockets in its ends, each socket being formed with a spherical seat, a pair of cock shells for attaching the indicator to a boiler, each shell having a nipple projecting into one of the sockets of said member and formed with a terminal peripherally projecting flange having spherically constructed upper and lower surfaces complemental with the seat of such socket, and means for forcing the flange of each nipple towards its seat to produce a fluid-tight joint.

In testimony whereof I affix my signature.

RICHARD KLINGER.